US008861703B2

(12) United States Patent
Labrador et al.

(10) Patent No.: US 8,861,703 B2
(45) Date of Patent: *Oct. 14, 2014

(54) SYSTEM AND METHOD FOR RECONNECTING A DEVICE TO A GROUP CALL (75) Inventors: Christopher Labrador, Waterloo (CA); Brian Oliver, Waterloo (CA); Douglas Gisby, Redwood City, CA (US); Susie Simon-Daniels, Kitchener (CA); Adrian Logan, Waterloo (CA); Eric Fritzley, Waterloo (CA); Brian McColgan, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 163 days.

This patent is subject to a terminal disclaimer.

(21) Appl. No.: 13/536,940

(22) Filed: Jun. 28, 2012

(65) Prior Publication Data
US 2012/0263287 A1    Oct. 18, 2012

Related U.S. Application Data (63) Continuation of application No. 12/394,377, filed on Feb. 27, 2009, now Pat. No. 8,238,537.

(51) Int. Cl.
*H04M 3/42*    (2006.01)
*H04M 3/56*    (2006.01)

(52) U.S. Cl.
CPC ........ *H04M 3/56* (2013.01); *H04M 2203/2088* (2013.01)
USPC ............. 379/202.01; 379/201.01; 379/100.05

(58) Field of Classification Search
USPC ........................... 379/202.01, 201.01, 100.05
See application file for complete search history.

(56) References Cited

U.S. PATENT DOCUMENTS

| | | | |
|---|---|---|---|
| 6,163,692 | A | 12/2000 | Chakrabarti et al. |
| 2006/0031290 | A1 | 2/2006 | Mannaru et al. |
| 2008/0037746 | A1 | 2/2008 | Dufrene et al. |
| 2008/0165945 | A1 | 7/2008 | Vadlakonda et al. |
| 2010/0027775 | A1 | 2/2010 | I'Anson |

FOREIGN PATENT DOCUMENTS

| | | |
|---|---|---|
| EP | 1480427 | 11/2004 |
| GB | 2446191 | 6/2008 |
| WO | 0152513 | 7/2001 |
| WO | 2006036259 | 4/2006 |

*Primary Examiner* — Quynh Nguyen (74) *Attorney, Agent, or Firm* — Finnegan, Henderson, Farabow, Garrett & Dunner, LLP (57) ABSTRACT A system and method for reestablishing a voice communications session moderated by a group call server between two or more telephony devices. The method is performed by a processor monitoring the communications session. The method comprises: storing one or more data records representing group call information; detecting disconnection of at least one participating telephony device from the group communications session, and determining that the disconnection was not intentionally initiated; accessing the stored call group information data and causing signals to enable reestablishment of participation by the disconnected device to be sent to the disconnected device; and upon receipt by the group call server from the disconnected device of signals representing a request to reconnect the disconnected device, outputting command signals for reestablishing a communications session between the disconnected device and at least one other device participating in the group communications session.

14 Claims, 7 Drawing Sheets

SYSTEM AND METHOD FOR RECONNECTING A DEVICE TO A GROUP CALL

This application is a continuation of U.S. application Ser. No. 12/394,377, filed Feb. 27, 2007, which is incorporated herein by reference in its entirety.

FIELD

The present application relates generally to telecommunications and, more specifically, to a system and method for reconnecting a device to a group, or conference, call

BACKGROUND

A conference call, sometimes also referred to as a group call, is typically a voice call among two or more participant devices. Such a call is typically moderated by a call moderator, such as a suitably-programmed telephone services server, which can be controlled either by one of the call participant devices or by an independent party not controlled by either of the call participant devices, and each participant must be authorized and authenticated by the call controller in order to join the call. This authorization and authentication typically requires the user to enter a passcode or PIN, which may comprise a lengthy series of numbers or other identifiers.

During a conference call, a device participating in the call may be disconnected from the group call by hanging up or by the call moderator ending the call with that device. However, in some cases, the device is unintentionally disconnected from the group call, for example when a participating wireless communications device enters a tunnel or otherwise loses signal coverage. In order to reconnect a disconnected device to a group call, for example when the device emerges from the tunnel and regains signal coverage, it is generally necessary for the device to be re-authorized and re-authenticated by a user of the disconnected device re-dialing the call-in number and re-entering the lengthy passcode. This may be burdensome for the user and may not be easily carried out.

It would be desirable to provide a convenient and secure way to reconnect the device to the group or conference call.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In one aspect, the present application provides a method for reestablishing a voice communications session moderated by a group call server between two or more telephony devices. The method is performed by a processor monitoring the communications session. The method comprises: storing, in a memory accessible by a processor monitoring participation of at least one telephony device in a group communications session between a plurality of participating telephony devices, one or more data records representing group call information, the group call information including information useable for reestablishing participation by the at least one telephony device in the group call session; detecting disconnection of the at least one participating telephony device from the group communications session, and determining that the disconnection was not intentionally initiated; accessing the stored call group information data and, using such accessed data, causing signals adapted to enable reestablishment of participation by the at least one disconnected telephony device in the group call session to be sent from the group call server to the at least one disconnected telephony device; and upon receipt by the group call server from the at least one disconnected telephony device of signals representing a request to reconnect the disconnected telephony device with the group communications session, outputting command signals adapted for reestablishing a communications session between the disconnected participating device and at least one other device participating in the group communications session.

In another aspect, the present application provides a method in a device for reconnecting the device to a group call in an enterprise communication network, the network comprising a group call server. The method comprises: maintaining, at the device, connection information for the group call; detecting, at the device, an unintentional disconnect of the device from the group call; sending a reconnection request to the server, the reconnection request containing the connection information; and reconnecting to the group call.

In another aspect, the present application provides a system configured for reestablishing a voice communications session moderated by a group call server between two or more telephony devices. The system comprises a processor and a memory accessible by the processor, wherein: the memory comprises one or more data records representing group call information, the group call information including information useable for reestablishing participation by the at least one telephony device in the group call session. The processor is configured to: detect disconnection of the at least one participating telephony device from the group communications session, and to determine that the disconnection was not intentionally initiated; access the stored call group information data and, using such accessed data, cause signals adapted to enable reestablishment of participation by the at least one disconnected telephony device in the group call session to be sent from the group call server to the at least one disconnected telephony device; and upon receipt by the group call server from the at least one disconnected telephony device of signals representing a request to reconnect the disconnected telephony device with the group communications session, output command signals configured to reestablish a communications session between the disconnected participating device and at feast one other device participating in the group communications session.

Other aspects of the present application will be apparent to those of ordinary skill in the art from a review of the following detailed description in conjunction with the drawings.

Embodiments of the present application are not limited to any particular operating system, mobile device architecture, server architecture, or computer programming language.

The present application relates to the control and management of communications. Although reference may be made to "calls" in the description of example embodiments below, it will be appreciated that the described systems and methods are applicable to session-based communications in general and not limited to voice calls. It will also be appreciated that the systems and methods may not be limited to sessions and may be applicable to messaging-based communications in some embodiments.

Figure 1:
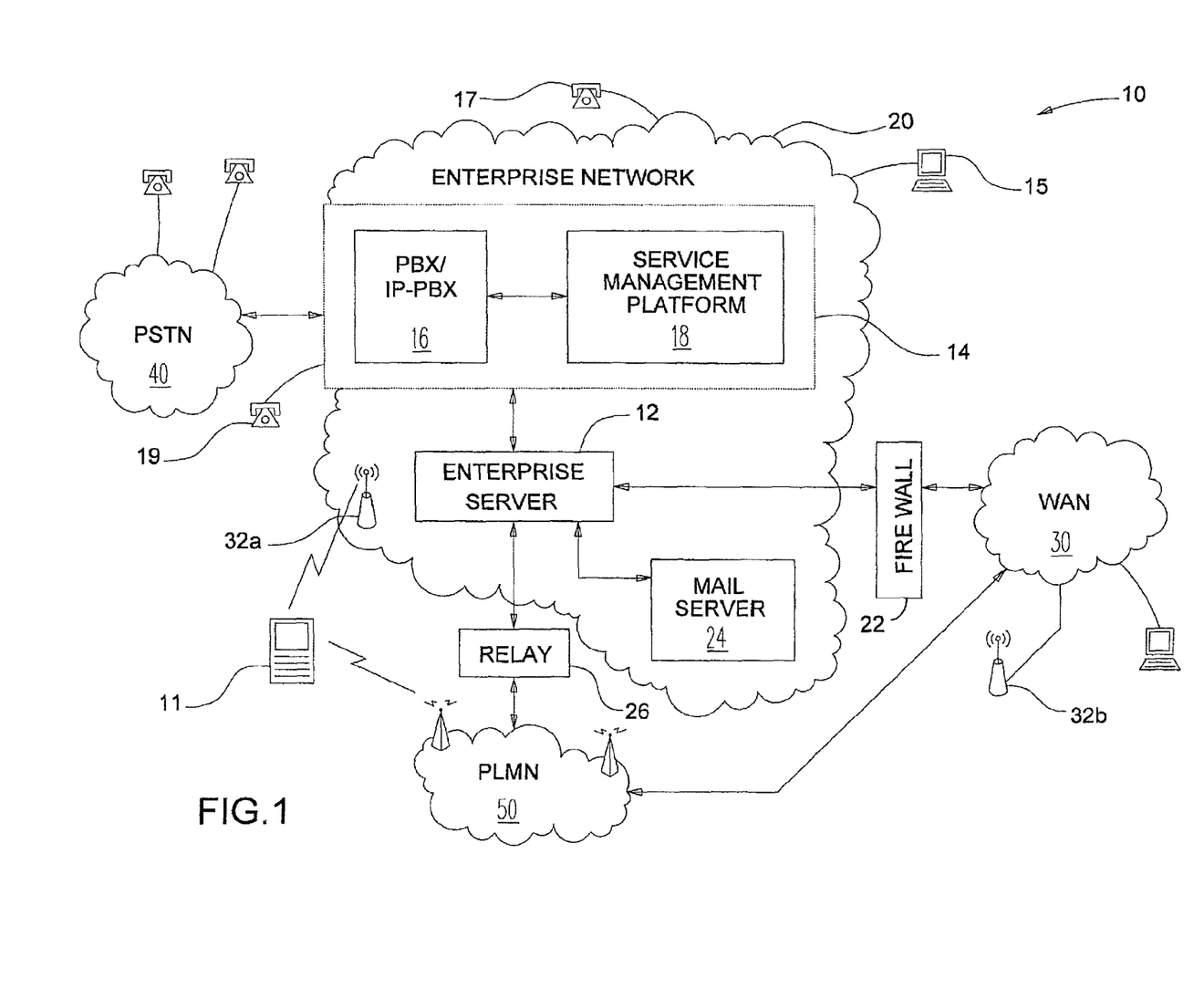
FIG. 1 shows, in block diagram form, an example system for managing enterprise-related mobile calls, including an enterprise communications platform.

Reference is now made to FIG. 1, which shows, in block diagram form, an example system, generally designated 10, for the control and management of communications. The system 10 includes an enterprise or business system 20, which in many embodiments includes a local area network (LAN). In the description below, the enterprise or business system 20 may be referred to as an enterprise network 20. It will be appreciated that the enterprise network 20 may include more than one network and may be located in multiple geographic areas in some embodiments.

The enterprise network 20 may be connected, often through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26, as known in the art.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped for cellular communication through the PLMN 50, mobile devices equipped for Wi-Fi communications over one of the WLANs 32, or dual-mode devices capable of both cellular and WLAN communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various embodiments, the PLMN 50 and mobile devices 11 may be configured to operate in compliance with any one or more of a number of wireless protocols, including GSM, GPRS, CDMA, EDGE, UMTS, EvDO, I-ISPA, 3GPP, or a variety of others. It will be appreciated that the mobile device 11 may roam within the PLMN 50 and across PLMNs, in known manner, as the user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages may be retrieved by the user using a messaging application, such as an e-mail client application. The messaging application may be operating on a user's computer 15 connected to the enterprise network 20 within the enterprise. In some embodiments, the user may be permitted to access stored messages using a remote computer, for example at another location via the WAN 30 using a VPN connection. Using the messaging application, the user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Together with the relay 26, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15.

As is typical in many enterprises, the enterprise network 20 includes a Private Branch eXchange 16 (although in various embodiments the PBX may be a standard PBX or an IP-PBX, for simplicity the description below uses the term PBX to refer to both) having a connection with the PSTN 40 for routing incoming and outgoing voice calls for the enterprise. The PBX 16 is connected to the PSTN 40 via DID trunks or PRI trunks, for example. The PBX 16 may use ISDN signaling protocols for setting up and tearing down circuit-switched connections through the PSTN 40 and related signaling and communications. In some embodiments, the PBX 16 may be connected to one or more conventional analog telephones 19. The PBX 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

The enterprise network 20 may further include a Service Management Platform (SMP) 18 for performing some aspects of messaging or session control, like call control and advanced call processing features. The SMP 18 may, in some cases, also perform some media handling. Collectively the SMP 18 and PBX 16 may be referred to as the enterprise communications platform, generally designated 14. It will be appreciated that the enterprise communications platform 14 and, in particular, the SMP 18, is implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

The enterprise communications platform 14 implements the switching to connect session legs and may provide the conversion between, for example, a circuit-switched call and a VoIP call, or to connect legs of other media sessions. In some embodiments, in the context of voice calls the enterprise communications platform 14 provides a number of additional functions including automated attendant, interactive voice response (IVR), call forwarding, voice mail, etc. It may also implement certain usage restrictions on enterprise users, such as blocking international calls or 1-900 calls. In many embodiments, Session Initiation Protocol (SIP) may be used to set up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 15. Example features may include direct extension dialing, enterprise voice mail, conferencing or other group calls, call transfer, call park, etc.

Figure 2:
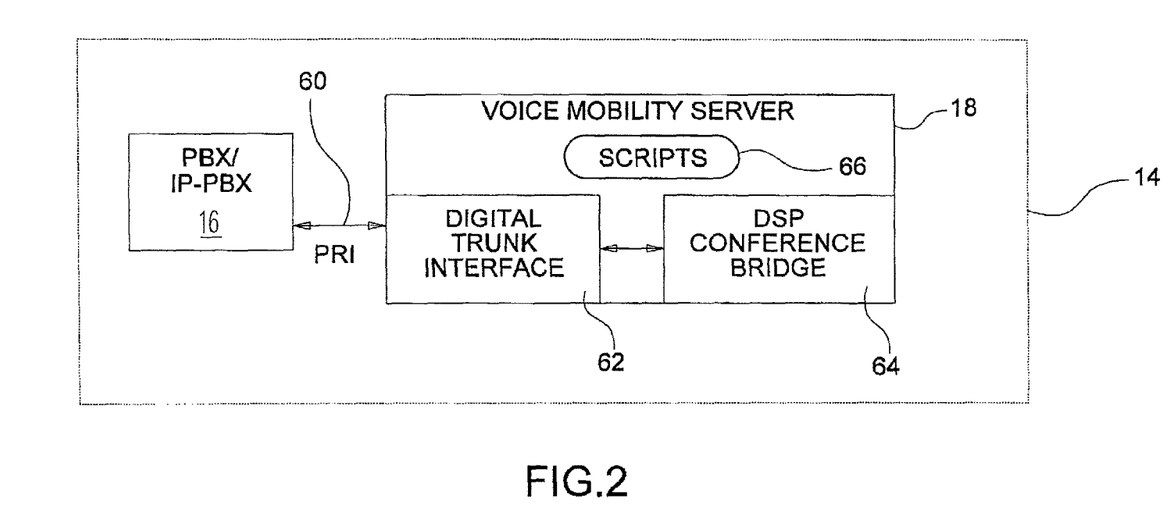
FIG. 2 shows, in block diagram form, further details of an embodiment of the enterprise communications platform.
Figure 3:
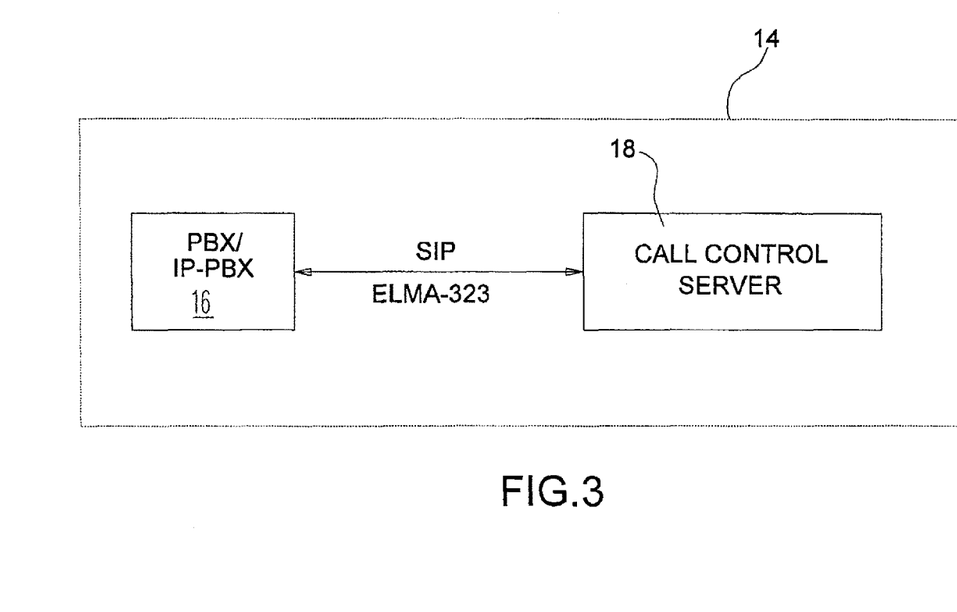
FIG. 3 shows, in block diagram form, another embodiment of the enterprise communications platform.
Figure 4:
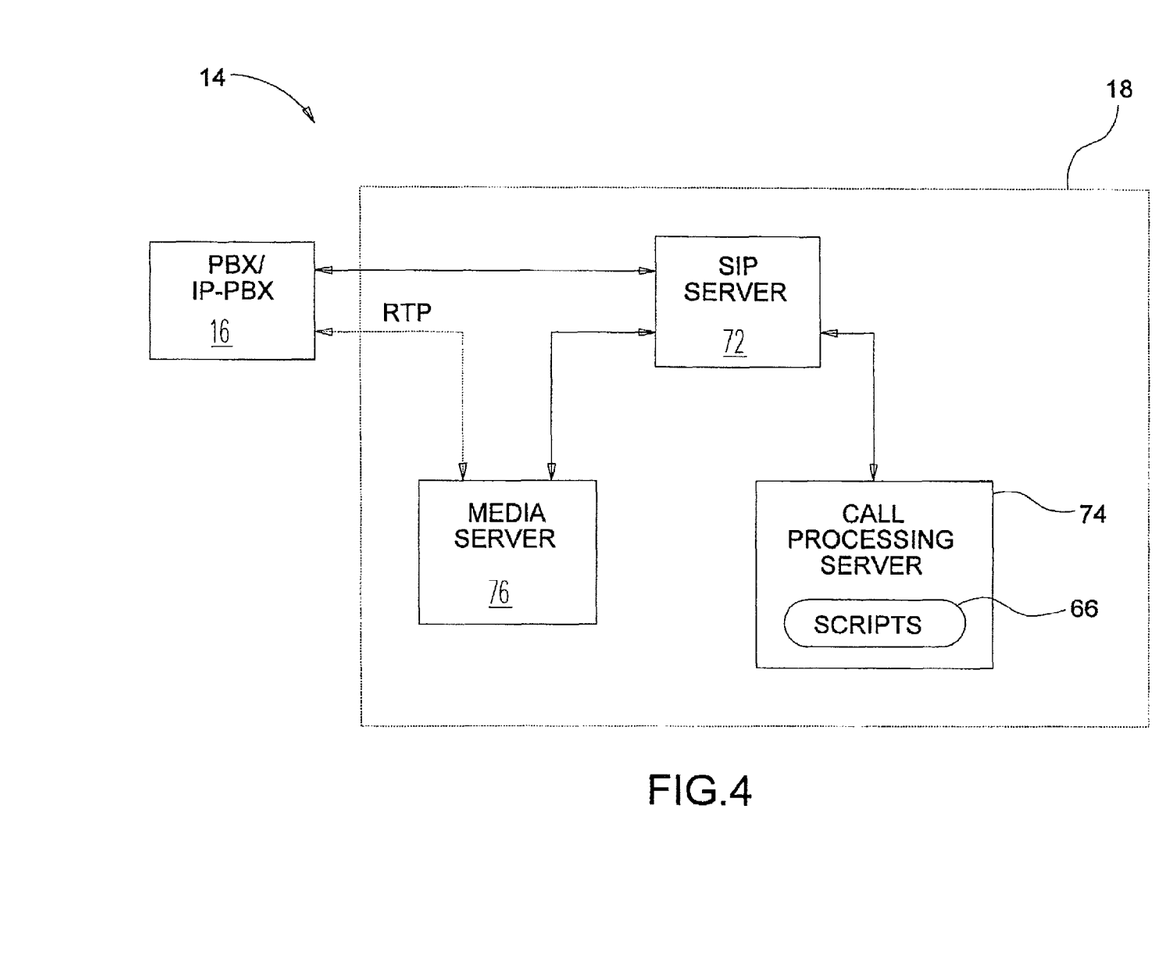
FIG. 4 shows, in block diagram form, yet another embodiment of the enterprise communications platform.

Reference is now made to FIGS. 2 to 4, which show example embodiments of the enterprise communications system 14. Again, although references are made below to "calls" or call-centric features it will be appreciated that the architectures and systems depicted and described are applicable to session-based communications in general and, in some instances, to messaging-based communications.

FIG. 2 illustrates an embodiment intended for use in a circuit-switched TDM context. The PBX 16 is coupled to the SMP 18 via PRI connection 60 or other suitable digital trunk. In some embodiments, the PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between the PBX 16 and the SMP 18.

In this embodiment, the SMP 18 assumes control over both call processing and the media itself. This architecture may be referred to as "First Party Call Control". Many of the media handling functions normally implemented by the PBX 16 are handled by the SMP 18 in this architecture. Incoming calls addressed to any extension or direct dial number within the enterprise, for example, are always first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor.

The SMP 18 may include various scripts 66 for managing call processing. The scripts 66 are implemented as software modules, routines, functions, etc., stored in non-volatile memory and executed by the processor of the SMP 18. The scripts 66 may implement call flow logic, business logic, user preferences, call service processes, and various feature applications.

FIG. 3 shows another embodiment of enterprise communications system 14, in which the PBX 16 performs the functions of terminating and/or bridging media streams, but call control functions are largely handled by the SMP 18. In this embodiment, the SMP 18 may be referred to as a call control server 18. This architecture may be referred to as "Third-Party Call Control".

The call control server 18 is coupled to the PBX 16, for example through the LAN, enabling packet-based communications and, more specifically, IP-based communications. In one embodiment, communications between the PBX 16 and the call control server 18 are carried out in accordance with SIP. In other words, the call control server 18 uses SIP-based communications to manage the set up, tear down, and control of media handled by the PBX 16. In one example embodiment, the call control server 18 may employ a communications protocol conforming to the ECMA-269 or ECMA-323 standards for Computer Supported Telecommunications Applications (CSTA).

FIG. 4 shows yet another embodiment of the enterprise communications system 14. This embodiment reflects the adaptation of an existing set of call processing scripts to an architecture that relies on third-party call control, with separate call control and media handling. The SMP 18 includes a call processing server 74. The call processing server 74 includes the scripts or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or ECMA-323 standards. These standards prescribe XML based messaging for implementing Computer Supported Telecommunications Applications (CSTA).

The SIP server 72 interacts with the media server 76 using SIP-based media handling commands. For example, the SIP server 72 and media server 76 may communicate using Media Server Markup Language (MSML) as defined in IETF document Saleem A., "Media Server Markup Language", Internet Draft, draft-saleem-msml-07, Aug. 7, 2008. The media server 76 may be configured to perform Host Media Processing (HMP).

Other architectures or configurations for the enterprise communications system 14 will be appreciated by those of ordinary skill in the relevant arts.

Figure 5A:
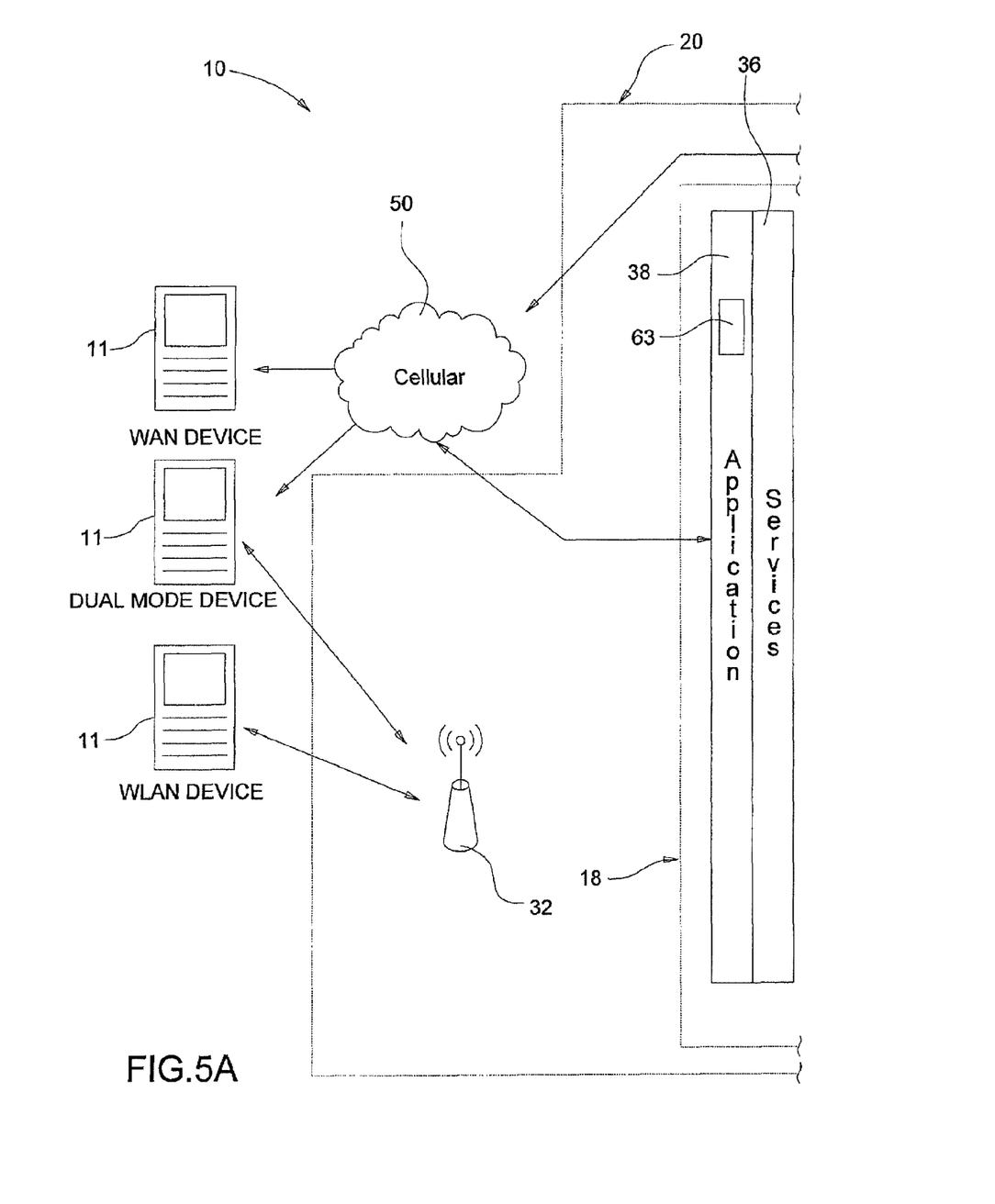
FIGS. 5A and 5B show, in block diagram form, further details of the enterprise communications platform of FIG. 3.
Figure 5B:
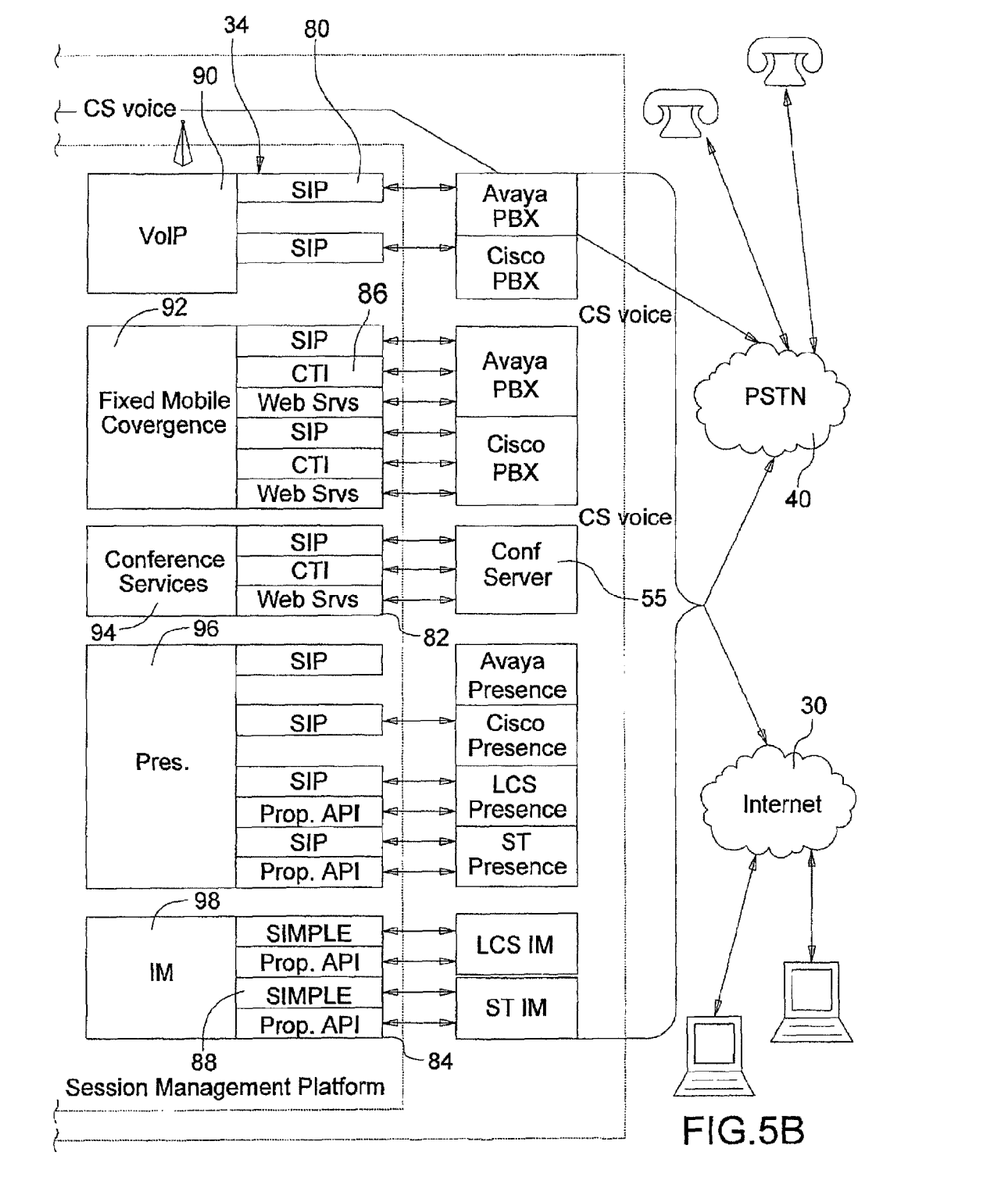

Reference is now made to FIGS. 5A and 5B, collectively referred to as FIG. 5, which shows another embodiment of the enterprise communications system 14 with a Third Party Call Control architecture. In this embodiment, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

Specifically, the protocol layer 34 preferably includes protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in the enterprise network 20, which will be further described below.

For the purposes of this disclosure, SIP 80 will be utilized, although it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). The specific operation of the system 10 utilizing SIP 80 will be described in further detail below.

The SMP 18 also includes a plurality of enablers, among other things, a VoIP enabler 90, a Fixed Mobile Convergence or FMC enabler 92, a conference or group call services enabler 94, a presence enabler 96 and an Instant Messaging or IM enabler 98. Each of the enablers 90-98 are used by corresponding services in the services layer 36 that combine one or more of the enablers. Each of the applications in the application layer 38 is then combined with one or more of the services to perform the desired application. For example, a phone call service may use the VoIP or PBX enabler, and an emergency response application may use the phone call service, an Instant Messenger service, a video call service, and email service and/or a conference service.

The application layer 38 may include a conference services application 63 that, together with the conference services enabler 94, enables multiple communication devices (including for example desk telephones and personal computers) to participate in a conference call through use of a centralized conference server 55. As seen in FIG. 5, the conference server 55 may be provided in the enterprise network 20 and may be in communication with the conference services enabler 94 through for example SIP protocol 80, although it is recognized that additional protocols that control media separate from data may be appropriate, such as the Web Services protocol 82 or the CTI protocol 86. As will be described in further detail below, the conference call server 55 may be configured for directing media and data streams to and from one or more communication devices (i.e., mobile devices 11, telephones 17, and computers 15).

Reference is again made to FIG. 1. As discussed above, the PLMN 50 may communicate with the relay 26, which in turn communicates with the enterprise network 20 via the enterprise server 12.

Group calls may be made through the PSTN 40 or using a mobile device 11 via the PLMN 50 or the WLAN 32*a*. In the case of a call made through the PSTN 40, the call may be monitored and otherwise moderated by an automatic data processor such as a suitably-configured enterprise server 12 through the VoiP 90 or FMC 92 components of the SMP 18, or by one or more processors associated with any one or more of participating devices 11, 15, 17, 19. For example, in the case of a call using a mobile device 11, the device 11 may send a presence signal at fixed time intervals to a moderating enterprise server 12. The presence signal may serve to let the enterprise server 12 know that the device 11 is still connected to the network. When one or more time intervals pass without a presence signal, the enterprise server 12 can thus detect that the device 11 has lost signal coverage or has stopped participating for other reasons, for example if the device 11 stops working (e.g., where the battery has run out). As will be understood by those skilled in the relevant arts, once they have been made familiar with this disclosure, similar monitoring, moderating, and re-connection processes may be performed by processors incorporated within any one or more of participating devices 11, 15, 17, 19.

The enterprise server 12 or other monitoring or moderating processor is thus able to confirm or otherwise determine the working state of a telephony device 11, 15, 17, 19. During a group call, a participant, such as a mobile telephony device 11, may be disconnected from the group call by intentional disconnection (e.g., by a user of the device "hanging up" the device 11, 15, 17, 19); by removal or disconnection by the moderator; or by disconnection through unavailability of the network or any component thereof necessary to maintain the group call.

The group call may be monitored and otherwise moderated by a group call server. In some embodiments, the group call server may be the enterprise server 12 or a dedicated application or circuit component thereof. Alternatively, the group call server may be a separate component within the enterprise network 20. For simplicity, this disclosure will discuss the embodiment where the group call server is the enterprise server 12. However, it will be immediately understood by those skilled in the relevant arts that the group call server may be a separate component.

A group call typically comprises a sustained voice/media session maintained between two or more participant devices by a moderator device, which performs functions such as initiation and termination of the various communications sessions which comprise the group call. Each of the devices may establish a call or session leg to the enterprise platform 14, by providing the required connection information (e.g., dial-in number, authorization passcode and authentication PIN) and the call legs are joined at the enterprise platform 14 into a group call.

The moderating device and each of the participating devices may perform the various functions described herein by executing scripted programming functions, as for example described herein. For example, the moderating enterprise server 12 may maintain accessible stored data records representing group call information, which may for example include information on the active call legs of the group call and the connection information, such as authorization and/or authentication information, for each call leg. Each device may also share in the group call information, thus each device shares in the information about, for example, the dial-in number for the group call, however each device may have restricted access to the connection information, such that it only shares in its own connection information, thus maintaining the privacy and security of any authorization or authentication information.

When the moderator device determines, as for example according to a suitably programmed protocol script, that a participant device should be disconnected from the group call, the moderator device communicates suitably-configured signals representing a disconnect command to the controlling enterprise server 12 (e.g., by a user sending an instructing to terminate a certain participant number to the enterprise server 12), the call leg of that participant is disconnected and the group call information is updated to note that call leg is no longer active and to remove its associated connection information from the group call information. An END OF CALL protocol message may be communicated to the group call server and/or the disconnected participant device to confirm the intentional disconnect.

When a user of a participating device wishes to disconnect the device from the group call, the user may cause the device to disconnect itself by sending an appropriate communication to the enterprise server 12 (e.g., by a user sending an END CALL request through the device 11 to the enterprise server 12); the call leg of that participant device may then be disconnected from the group call and the group call information is updated to note that call leg is no longer active and to remove its associated connection information from the group call information. An END OF CALL protocol message may be communicated to the group call server and/or the disconnected participant device to confirm the intentional disconnect. In both cases, the intentional disconnection of a call leg is preceded by a request for disconnection and may be confirmed by an END OF CALL indicator.

If a call leg is disconnected without a request for disconnection, e.g. if one of the participating devices ceases to respond to or provide required or expected communications the enterprise server 12 can determine that an unintentional disconnection has occurred by, for example, consulting the stored group call information data set and noting that the data set does not indicate that the device was intentionally disconnected (e.g., a corresponding flag may be set to a condition indicating that the device is intended to actively continue participating in the call). A reconnection may be attempted, the details of which are described below.

Figure 6:
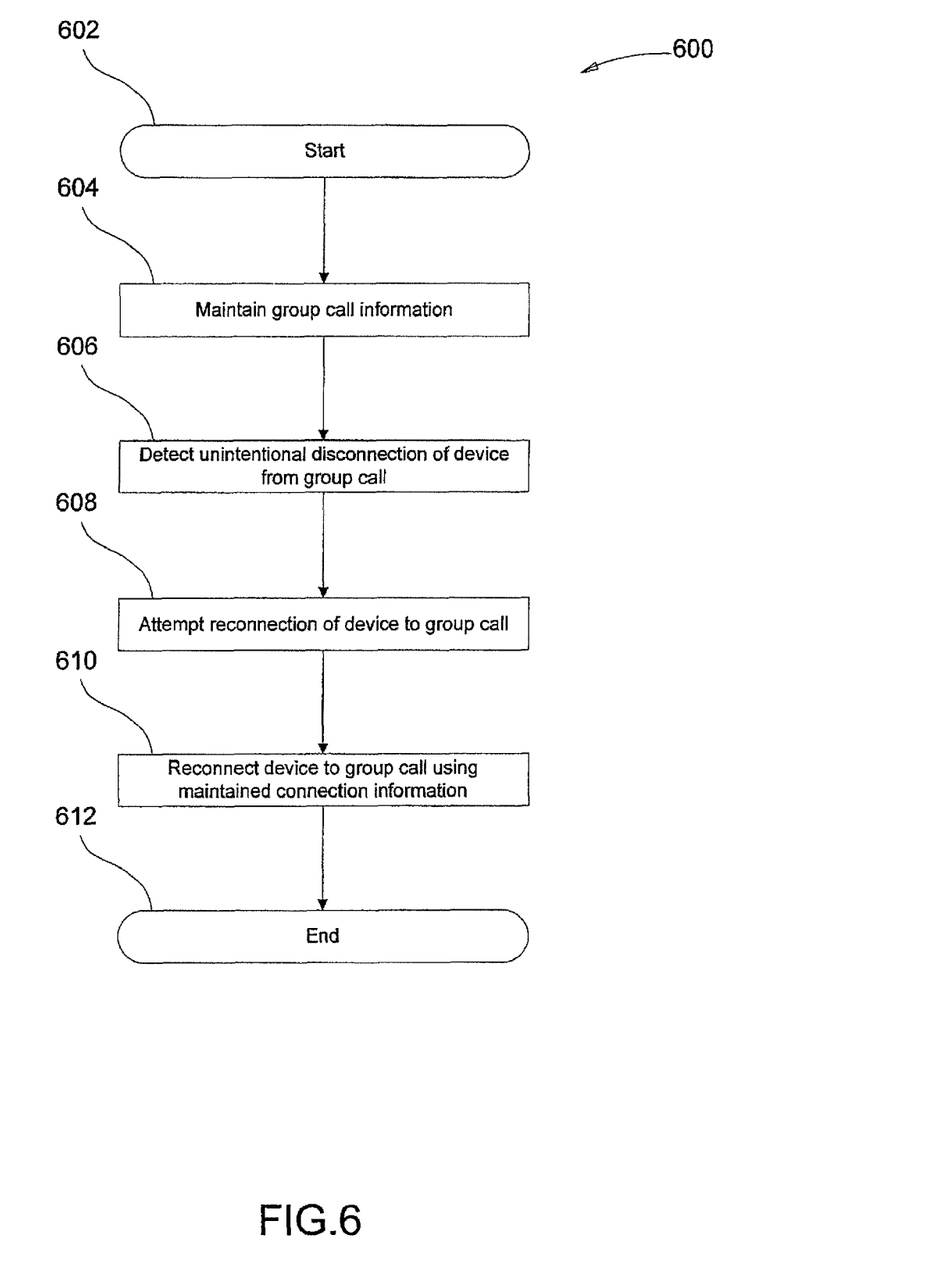
FIG. 6 shows, in flow chart form, an embodiment of a method for reconnecting a device to a group call, in accordance with one aspect of the disclosure.

Reference is now made to FIG. 6, which is a flowchart showing an embodiment of a general method 600 for reconnecting an unintentionally-disconnected device to a group call.

In the system 10, a user may participate in a group call, for example using a mobile device 11. Typically, when a device 11, 15, 17, 19 joins a group call, the user is required to enter connection information, such as an authorization passcode and/or an authentication PIN, and suitably-configured signals are forwarded to the moderating server or other device 12. The moderating server 12 may compare the provided passcode and/or pin to previously-established authentication codes and, on confirming that the provided codes are correct, can cause a suitable communications session, or 'connection', to be established. As described above, information relevant to the connection, such as one or more identifiers corresponding to the participating device, may be maintained in a stored data set representing the group call information by the enterprise server 12.

The method 600 can begin at block 602, the point at which a participating device 11, 15, 17, 19 has been unintentionally disconnected from a group call.

At block 604, since the enterprise server 12 did not receive any request for disconnecting the device 11, 15, 17, 19 from the group call, the group call information maintained by the enterprise server 12 is unchanged. That is, the group call information still notes the call leg for that device 11, 15, 17, 19 as being active and still includes the connection information for that call leg.

At block 606, the unintentional disconnection of the device 11, 15, 17, 19 is detected. This may for example be detected by the enterprise server 12 as the absence of a call leg that should be active according to the group call information. In some examples, this may be where a "heartbeat" or other timed participation signal is not received. In other examples, a timed participation signal may not be used, such as in a mobile device where such a signal would affect battery performance. The unintentional disconnection may be detected as the absence of an expected call leg, according to the group call information, and the absence of an END OF CALL indicator that would indicate that the disconnect was intentional. Because the enterprise server 12 is able to distinguish between intentional and unintentional disconnections, a reconnection is not attempted where the disconnection is intentional, which minimizes processing demands on the server 12. For example, when a user of a device 11, 15, 17, 19 wishes to terminate participation, the user can, as described above, cause a suitable call termination command to be sent to the moderating server 12, on receipt of which, the server 12 can cause a suitable flag to be set in the call information data set. Thus, a participant device that intentionally disconnects may be prevented from being burdened with a reconnection attempt from the enterprise server 12, and the user of that participant device 11, 15, 17, 19 is not bothered with a request from the enterprise server 12 for a reconnection.

At block 608, the enterprise server 12 attempts to reconnect the unintentionally disconnected device 11, 15, 17, 19 to the group call. This attempt may be carried out directly by the moderating server 12 or by any other suitably-configured component of enterprise platform 14. The reconnection attempt may comprise sending an invitation request to the device 11, 15, 17, 19 to rejoin the group call. For example, server 12 or a component associated therewith may cause signals representing a suitably-configured request or command to be sent to the disconnected device 11, 15, 17, 19. Such signals may, for example, cause the device 11, 15, 17, 19, to ring, and/or to present on a suitably-configured display information informing a user of the device 11, 15, 17, 19 of the attempt and inviting the user to reconnect by, for example, pressing a suitably-configured "pick up" or other key on the device 11, 15, 17, 19.

In some embodiments, the reconnection may be routed based on the least cost routing preferences of the system, if this has been preset. A reconnection indicator may also be communicated to the group call server and/or reconnected device, which may include information about the group call. This reconnection indicator may be useful for call and reporting statistics, and may help to avoid call collisions.

At block 610, if the device 11, 15, 17, 19 accepts the invitation, confirmation that the device 11, 15, 17, 19 is authorized to reconnect to the group call is made by the server 12 using the connection information that was maintained in the group call information. There is no need for the device 11, 15, 17, 19 to provide the enterprise server 12 with previously-provided passcodes, etc., to confirm authorization for reconnection. For example, authentication of the device 11, 15, 17, 19 may be carried out by comparing the connection information maintained in the enterprise server 12 with connection information maintained in the device 11, 15, 17, 19 or the unique PIN inherently associated with the device 11, 15, 17, 19. Instead of the PIN associated with the device 11, 15, 17, 19, a unique PIN associated with the user may be utilized. The user PIN may be created as part of the setup for a group call, and may offer greater security as it may be more difficult to be cloned or spoofed.

In some embodiments, the reconnection invitation may be automatically accepted by the device, without any requiring any input from the user. This may be the case, for example, where the user has preconfigured the device to automatically rejoin a group call. Alternatively, the reconnection invitation may trigger an output to the user, for example a dialog box, asking the user may choose whether or not to reconnect to the group call. The reconnection attempt may only proceed if there is a positive response. The user is not required to enter any details about the group call or any connection information, since this information is already available to the enterprise server 12 via the retained group call information.

As will be immediately understood by those skilled in the relevant arts, once they have been made familiar with this disclosure, any suitable refinements or limitations may be made on process for reestablishing group call connections according to the disclosure. For example, prior to initiating a reconnection attempt at 608 in process 600, the moderating server may confirm that other participants in the group call have not, within a desired time of the detected unintentional disconnection, intentionally disconnected; and/or the server 12 may confirm that the unintentional disconnection has not occurred longer than a predetermined elapsed time in the past.

Although the method 600 has been described as being carried out by the enterprise server 12, in some embodiments, the reconnection attempt may be initiated and executed by the device 11, 15, 17, 19, for example where the enterprise server 12 has given up attempts to reconnect the device 11, 15, 17, 19. The steps of the method 600 may be similarly carried out by the device 11, 15, 17, 19.

At the step 604, the connection information, or a suitable copy of all or a part thereof, may be maintained by the device 11, 15, 17, 19, but the connection information may be limited to information directly applicable to the device 11, 15, 17, 19. For example, the connection information maintained at the device 11, 15, 17, 19 may include only authorization and/or authentication information for that device 11, 15, 17, 19 and not other devices in the group call.

At 606, the device 11, 15, 17, 19 may detect an unintentionally disconnect when, for example, the device 11, 15, 17, 19 has neither sent nor received any END CALL request to the enterprise server 12. An unintentional disconnect may also be detected by the absence of an END OF CALL indicator, which normally indicates an intentional disconnect as explained above.

At 608, the device 11, 15, 17, 19 attempts to reconnect to the group call through the moderating server, or the moderating server 12 attempts to reconnect the device 11, 15, 17, 19. This step may first require confirmation (e.g., via a YES/NO dialog box) from the user that the reconnection should be made. Because the device 11, 15, 17, 19 maintains the connection information, this information may be provided to the enterprise server 12 in order to rejoin the group call. The user thus does not need to re-enter any connection information, such as authorization and/or authentication information, or even the call-in number for the group call. This may be referred to as a "one button join", where the user only has to press a single button to indicate a YES response to a dialog box asking whether or not to join a group call, and no other input is required from the user. The device 11, 15, 17, 19 may attempt to reconnect automatically without any user input, for example where the user has preconfigured the device 11, 15, 17, 19 to automatically reconnect to a group call.

The device 11, 15, 17, 19 may be preconfigured to automatically rejoin a group call without requiring any confirmation from the user; optionally such a setting may be overruleable by suitable scripting of the enterprise server 12, for example based on security policies set on the server.

At 610, the device 11, 15, 17, 19 is reconnected to the group call. This may include authorization and/or authentication (or confirmation of previous authorization or authentication) of the device 11, 15, 17, 19 by the enterprise server 12, for example by comparing the connection information in the group call information maintained at the enterprise server 12 with the connection information provided by the device 11, 15, 17, 19.

In some embodiments, the enterprise server 12 will attempt to reconnect to a device 11, 15, 17, 19 that was unintentionally disconnected for only a preset period of time, for example 10 minutes, after which no further reconnection attempts will be made. This situation may occur where the device 11, 15, 17, 19 has roamed into an area with no signal coverage, for example a tunnel. When the device 11, 15, 17, 19 regains signal coverage, although there may be no further reconnection attempts from the enterprise server 12, the device 11, 15, 17, 19 retains the group call information, and thus may itself attempt to reconnect with the group call as described above.

In some embodiments, for example where the device 11, 15, 17, 19 is unintentionally disconnected due to loss of signal coverage, the enterprise server 12 will make a reconnection attempt only when the enterprise server 12 detects that the device 11, 15, 17, 19 has regained signal coverage. This may be suitable where the device 11, 15, 17, 19 is configured to send a presence signal to the enterprise server 12 at fixed time intervals, as discussed above. When one or more time intervals pass without a presence signal being received at the enterprise server 12, the enterprise server 12 determines that the device 11, 15, 17, 19 has lost signal coverage. It may be a waste of computing resources to attempt to reconnect the device 11, 15, 17, 19 immediately, since the attempt is sure to fail without signal coverage. Instead, the enterprise server 12 may wait until a presence signal is again received from the device 11, 15, 17, 19, indicating that the device 11, 15, 17, 19 has regained signal coverage. Only after the enterprise server 12 has determined that the device 11, 15, 17, 19 has regained signal coverage will the enterprise server 12 attempt to reconnect to the device 11, 15, 17, 19.

Although the above description refers to the enterprise server 12 and the enterprise communication platform 14, in some embodiments, here network topology permits, an unintentionally disconnected call leg may be reconnected by low level network layers using the shared group call information. This may be based on the least cost routing preferences preset by the system.

Certain adaptations and modifications of the described embodiments can be made. Therefore, the above discussed embodiments are considered to be illustrative and not restrictive.

What is claimed is:

1. A method executed by a group call server, for reestablishing a voice communications session moderated by the group call server between two or more telephony devices participating in a group communications session, wherein the group call server has access to group call information, the group call information including information useable for reestablishing participation by a telephony device in the group communications session, and the group call information including call leg information associated with the participating telephony device, the method comprising:

automatically detecting disconnection of the participating telephony device from the group communications session, and automatically determining that the disconnection was not intentionally initiated by:

comparing, said call leg information to active call legs in the group communications session, and         determining that number of current active call legs is less than a previously determined number of active call legs; and         sending signals adapted to invite reestablishment of participation by the disconnected telephony device in the group communications session to the disconnected telephony device; and         upon receipt by the group call server from the disconnected telephony device of signals representing a request to reconnect the disconnected telephony device with the group communications session, outputting command signals that reestablish a communications session between the disconnected participating device and one other device participating in the group communications session, using the group call information.

2. The method of claim 1, wherein:
the monitoring participation of the telephony device comprises monitoring transmission of a signal within a fixed time interval from the participating telephony device to the group call server.

3. The method of claim 1, further comprising:
determining an absence of an end of call indicator indicating an intentionally initiated disconnection.

4. The method of claim 1, wherein the information useable for reestablishing participation by the telephony device in the group communications session comprises at least one of authorization information and authentication information.

5. The method of claim 4, wherein reconnecting the telephony device comprises authorizing or authenticating the device using the at least one of authorization information and authentication information.

6. A method executed by a terminal device, for reestablishing a voice communications session, the terminal device being a participant in a group communications session moderated by a group call server, wherein the terminal device has access to group call information, the group call information including information useable for reestablishing participation by the terminal device in the group communications session, and the group call information including call leg information associated with the participating telephony device, the method comprising:

automatically detecting, at the terminal device, disconnection of the terminal device from the group communications session, and automatically determining that the disconnection was not intentionally initiated by:

comparing, said call leg information to active call legs in the group communications session, and         determining that number of current active call legs is less than a previously determined number of active call legs; and         sending signals that request reestablishment of participation in the group communications session to the group call server; and         upon receipt by the terminal device from the group call server of signals to reestablish participation of the terminal device in the group communications session, reconnecting the terminal device with the group communications session, using the group call information.

7. The method of claim 6, further comprising:
displaying a request to confirm a reestablishing attempt; and
sending signals to request reestablishing of participation in the group communications session only upon receiving a positive response to the request to confirm.

8. The method of claim 6, wherein the connection information comprises at least one of: dial-in information, authorization information and authentication information.

9. The method of claim 6, wherein determining that the disconnection was not intentionally initiated comprises:
determining an absence of an end of call indicator indicating an intentionally initiated disconnection.

10. A system configured for reestablishing a voice communications session moderated by a group call server between two or more telephony devices, the system having access to a memory comprising group call information, the group call information including information useable for reestablishing participation by a telephony device in a group communications session, wherein the group call information includes call leg information associated with the participating telephony device, the system comprising:

a processor configured to:

automatically detect disconnection of the participating telephony device from the group communications session, and to automatically determine that the disconnection was not intentionally initiated by:

comparing, said call leg information to active call legs in the group communications session, and         determining that number of current active call legs is less than a previously determined number of active call legs; and         send signals that enable reestablishment of participation by the disconnected telephony device in the group communications session to the disconnected telephony device; and         upon receipt by the group call server from the disconnected telephony device of signals representing a request to reconnect the disconnected telephony device with the group communications session, output command signals configured to reestablish a communications session between the disconnected participating device and at least one other device participating in the group communications session, using the group call information.

11. The system of claim 10, wherein:
the determining that the disconnection was not intentionally initiated comprises monitoring transmission of a signal within a fixed time interval from the participating telephony device to the group call server.

12. The system of claim 10, further comprising:
determining an absence of an end of call indicator indicating an intentionally initiated disconnection.

13. The system of claim 10, wherein the information useable for reestablishing participation by the at least one telephony device in the group communications session comprises at least one of authorization information and authentication information.

14. The system of claim 13, wherein reconnecting the at least one telephony device comprises authorizing or authenticating the device using the at least one of authorization information and authentication information.

* * * * *

UNITED STATES PATENT AND TRADEMARK OFFICE
CERTIFICATE OF CORRECTION

PATENT NO. : 8,861,703 B2  
APPLICATION NO. : 13/536940  
DATED : October 14, 2014  
INVENTOR(S) : Douglas Gisby et al.

It is certified that error appears in the above-identified patent and that said Letters Patent is hereby corrected as shown below:

Title page, item (75), lines 1-3, the order of the inventors should be listed as follows:

Inventors: Douglas Gisby, Redwood City, CA (US); Christopher Labrador, Waterloo (CA); Brian Oliver, Waterloo (CA); Susie Simon-Daniels, Kitchener (CA); Adrian Logan, Waterloo (CA); Eric Fritzley, Waterloo (CA); Brian McColgan, Toronto (CA)

In the Specification

Col. 1, line 12, "or conference, call" should read -- or conference call. --.

Col. 2, line 60, "and at feast one other device" should read -- and at least one other device --.

Col. 9, line 14, "sending an instructing to" should read -- sending an instruction to --.

Col. 11, line 16, "asking the user may choose" should read -- asking the user to choose --.

Col. 12, line 31, insert a space after "11".

Col. 12, line 52, "here network topology permits" should read -- where network topology permits --.

Signed and Sealed this  
Twenty-fourth Day of February, 2015

Michelle K. Lee  
*Deputy Director of the United States Patent and Trademark Office*

UNITED STATES PATENT AND TRADEMARK OFFICE
CERTIFICATE OF CORRECTION

PATENT NO. : 8,861,703 B2  
APPLICATION NO. : 13/536940  
DATED : October 14, 2014  
INVENTOR(S) : Douglas Gisby et al.

Page 1 of 1

It is certified that error appears in the above-identified patent and that said Letters Patent is hereby corrected as shown below:

Title page, item (12), "Labrador et al." should read -- Gisby et al. --.

Title page, item (75), lines 1-3, the order of the inventors should be listed as follows:

Inventors: Douglas Gisby, Redwood City, CA (US); Christopher Labrador, Waterloo (CA); Brian Oliver, Waterloo (CA); Susie Simon-Daniels, Kitchener (CA); Adrian Logan, Waterloo (CA); Eric Fritzley, Waterloo (CA); Brian McColgan, Toronto (CA)

In the Specification

Col. 1, line 12, "or conference, call" should read -- or conference call. --.

Col. 2, line 60, "and at feast one other device" should read -- and at least one other device --.

Col. 9, line 14, "sending an instructing to" should read -- sending an instruction to --.

Col. 11, line 16, "asking the user may choose" should read -- asking the user to choose --.

Col. 12, line 31, insert a space after "11".

Col. 12, line 52, "here network topology permits" should read -- where network topology permits --.

This certificate supersedes the Certificate of Correction issued February 24, 2015.

Signed and Sealed this  
Seventeenth Day of March, 2015

Michelle K. Lee  
*Director of the United States Patent and Trademark Office*